United States Patent [19]
Banner

[11] 3,935,952
[45] Feb. 3, 1976

[54] FEED DEVICE FOR BULK MATERIAL

[76] Inventor: Kurt Albert Banner, Fargaregatan 6 A, Goteborg, Sverige, Sweden

[22] Filed: Aug. 2, 1974

[21] Appl. No.: 496,731

[30] Foreign Application Priority Data
Aug. 31, 1973 Sweden .............................. 7311868

[52] U.S. Cl. ................................ 214/17 D; 222/409
[51] Int. Cl.² ......................................... B65G 65/44
[58] Field of Search .......... 214/17 D; 222/409, 410; 198/60, 220 BA

[56] References Cited
UNITED STATES PATENTS

| | | | |
|---|---|---|---|
| 1,681,592 | 8/1928 | Miller et al. .................... | 222/409 X |
| 1,720,131 | 7/1929 | Lemont ........................ | 198/220 BA |

Primary Examiner—Robert J. Spar
Attorney, Agent, or Firm—Ulle C. Linton

[57] ABSTRACT

A feed device for bulk material, placed in a silo in order to feed out the material stored in the silo. The feed device comprises reciprocally movable means in the form of steps and carrier elements in the form of risers with said steps leading downwards to at least two feeding-out openings. The steps are leading downwards in opposite direction from a highest level to a lowest level located at said openings.

5 Claims, 3 Drawing Figures

FEED DEVICE FOR BULK MATERIAL

The present invention relates to a feed device for bulk material, intended to be placed by way of example in a silo in order to feed out the material stored in the silo.

It is an object of the present invention to provide a feed device of the kind mentioned above, the design of which makes it suitable for connection to a receptacle of cylindrical or semicylindrical shape, while known designs of the prior art are best suitable for connection to shafts exhibiting a rectangular bottom surface.

Figure 1:
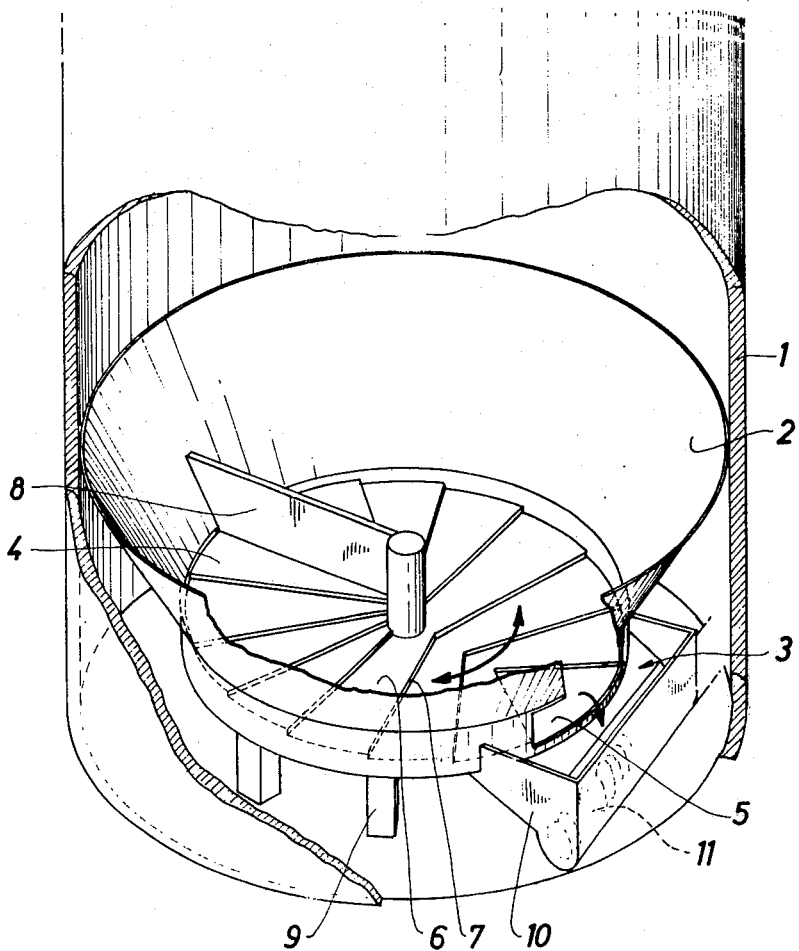
Figure 2:
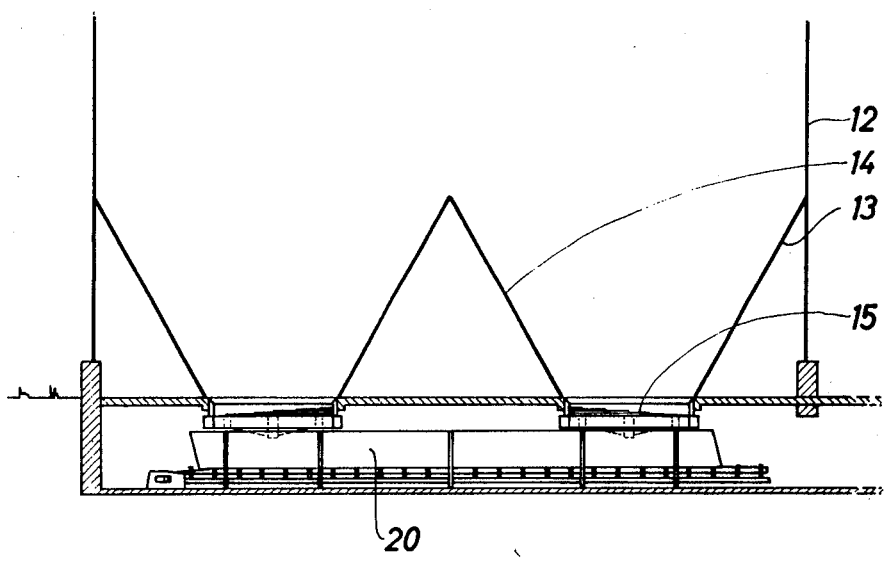
Figure 3:
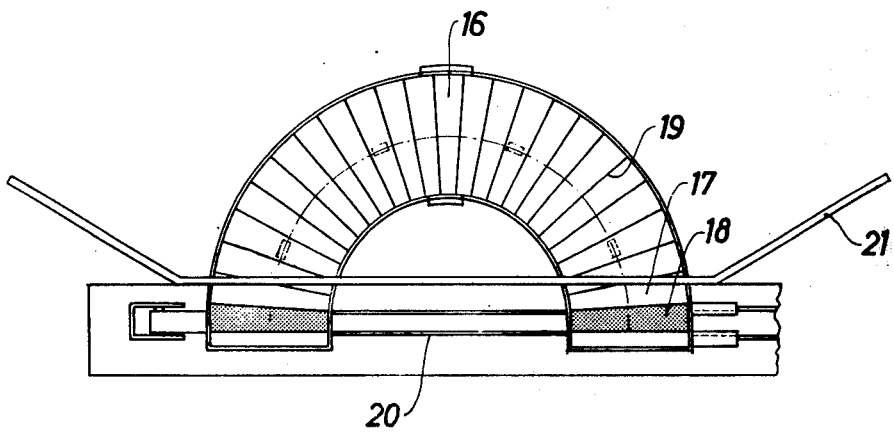

The embodiments of the invention are illustrated in the accompanying drawings, in which FIG. 1 is a partly broken perspective view showing a feed device according to a first embodiment, FIG. 2 illustrates a vertical cross section through a device according to a second embodiment, and FIG. 3 is a top view of a device according to a third embodiment.

The basic principle of the device according to the invention is a circular or semicircular disc or ring pivotably mounted round a vertical axis at the bottom of the shaft intended for storage. The disc has a stairlike top side with one or several elevated portions, from which the steps lead downwards towards lowered portions provided with openings. The stored material in the shaft, which extends upwards from the disc, rests on the substantially horizontal portions of the steps and is fed down into the opening connected with the lowest step or steps by the reciprocating pivoting movement of the disc around the axis pushing said material to said opening to be forwarded.

In the embodiment illustrated in FIG. 1 the feed device is installed in a circular silo 1 in the bottom of which a hopper 2 is arranged in order to reduce the dimensions of the feed device. The disc 3 of the feed device is arranged in connection with the lower edge of the hopper 2, and said disc has a number of steps extending from the highest level 4 down to the lowest level 5 with treads 6 and risers 7. A wing 8 projects from the hopper 2 in a radial direction to the center of the disc at the highest level 4 thereof, and the disc is journaled and driven to pivot back and forth around its center around a vertical axis. The bearing arrangement suitably comprises rollers (not shown) supported by a column 9, and the drive can be arranged by means of hydraulic power cylinders or connecting rods.

Right in front of the lowest level 5 of the disc 3 there is an opening in the hopper 2, which opening communicates with a collection trough 10 with a worm conveyor 11. Thus, the disc 3 inside its circular edge does not have any opening, as the material is intended to be let down over the edge of the disc into the trough 10 according to the indication of the arrow inserted in the figure. The feed motion is facilitated by the risers, which at the highest level 4 are substantially radial, but change to another pattern according to which they meet at an angle, each successive apex being located farther away from the center of the disc. This design is clearly evident from the FIG. 1.

In the embodiment according to FIG. 2 the storage shaft for the bulk material is formed by a circular silo 12 with an outer bottom hopper 13 and inner cone 14 with its point turned upwards. Between the hopper 13 and the cone 14 an annular compartment is provided, in which the stairlike feed organ, an annular disc 15, is located. In similar manner to the disc 3 of FIG. 1 the disc 15 is journaled and driven in order to perform its reciprocating pivoting movement. The disc 15 has two diametrically opposed lowest portions, from which the disc in stairlike form bends in both directions to two highest portions, placed right between the lowest portions. In each one of the lowest portions an opening is arranged.

The design of the disc also is evident from the FIG. 3. This figure to be sure shows in top view a ring, which only has an extension of 180°, but if a doubling of this ring is imagined, the figure can also apply to the embodiment according to FIG. 2. Thus, at 16 the highest step is indicated and at 17 the lowest step, which in case of an entire ring would make a number of four. Two openings 18 are provided in the ring at the two lowest levels, and, as is evident from the figure, the risers 19 of the stairs extend in radial directions.

Below the openings 18 and unto the delivery station of the feed device a feed chute 20 extends, which here is illustrated as a shaking chute.

The embodiment of the feed device illustrated in FIG. 3 as to its design should be evident from the preceding description. This design is not very well suitable for a circular silo, but is suitably used in connection by way of example with material bins having a rear wall 21 and a bottom inclining against said wall.

During the feeding operation the disc, by means of the driving mechanism, is pivoting in a reciprocating movement, the pivoting angle of which suitably is smaller than the width of a step on the feed disc and smaller than the width of the step at the highest level 4 of the disc 3 respectively. When the pivoting movement is taking place in one direction the risers 7, 19 feed the material in front of themselves towards the lowest level at the same time as a certain drag of the material, by way of example wood chips or coke, takes place by the friction against the treads 6. During the retrograding phase of the pivoting movement only the last mentioned action takes place, and therefore the feed action strongly dominates in the intended direction down towards the lowest level for the feed-out into the trough 10 and through the openings 18 respectively. The action of the retrograde feed can be reduced, if the treads are given a slight inclination in the direction of feed, which, however, is not absolutely necessary. By the special angular arrangement of the lower steps of the disc 3 a certain outwardly directed feed is obtained in connection with them, something that facilitates the sweeping of the material over the edge of the disc and down into the trough 10. After the material has been fed down from the disc, it is taken by the worm conveyor 11 and the shaking chute 20 respectively.

I claim:

1. Feed device for the bottom of a silo or other relatively large receptacles for bulk material, for example wooden chips, said feed device comprising driven means movable in a reciprocal substantially horizontal motion and having a number of steps, carrier elements in the form of risers of said steps and at least two feeding-out openings, said steps being defined by a circular line, in which the center of curvature substantially corresponds to the center of motion, and said steps leading downwards in opposite directions from at least one point at a highest level to at least two points at a lowest level, located at said feeding-out openings.

2. Feed device according to claim 1 wherein said movable means is a circular disc with one point at the highest level from which the steps lead downwards and at least two points at the lowest level located near to said feeding-out openings.

3. Feed device according to claim 2, wherein the risers have a radial extension at said highest point but change to another pattern according to which they occur at an angle, the apex of each successive angle being located farther away from the center of said disc as the steps descend to said lowest point.

4. Feed device according to claim 1, wherein said movable means has the configuration of a circular ring.

5. Feed device according to claim 1, wherein said movable means has the configuration of one half of a circular ring.

* * * * *